US012347947B2

(12) United States Patent
Fujii et al.

(10) Patent No.: US 12,347,947 B2
(45) Date of Patent: Jul. 1, 2025

(54) ANTENNA ELEMENT

(71) Applicant: Murata Manufacturing Co., Ltd., Kyoto (JP)

(72) Inventors: Hirotaka Fujii, Kyoto (JP); Koji Kamada, Kyoto (JP); Daisuke Doi, Kyoto (JP)

(73) Assignee: MURATA MANUFACTURING CO. , LTD., Nagaokakyo (JP)

( * ) Notice: Subject to any disclaimer, the term of this patent is extended or adjusted under 35 U.S.C. 154(b) by 188 days.

(21) Appl. No.: 18/364,477

(22) Filed: Aug. 3, 2023

(65) Prior Publication Data

US 2023/0378651 A1 Nov. 23, 2023

Related U.S. Application Data

(63) Continuation of application No. PCT/JP2022/028460, filed on Jul. 22, 2022.

(30) Foreign Application Priority Data

Aug. 18, 2021 (JP) ................................ 2021-133496

(51) Int. Cl.
*H01Q 9/04* (2006.01)
*H01Q 1/22* (2006.01)
*H01Q 1/38* (2006.01)

(52) U.S. Cl.
CPC ......... *H01Q 9/0414* (2013.01); *H01Q 1/2283* (2013.01); *H01Q 1/38* (2013.01)

(58) Field of Classification Search
CPC ...... H01Q 9/0414; H01Q 1/2283; H01Q 1/38; H01Q 1/48; H01Q 9/0407
See application file for complete search history.

(56) References Cited

U.S. PATENT DOCUMENTS 7,812,767 B2 * 10/2010 Seki ....................... H01Q 19/17 343/837
8,976,068 B2 * 3/2015 Hamabe ................... H01Q 1/38 343/702
(Continued)

FOREIGN PATENT DOCUMENTS

JP 2004-312546 A 11/2004
JP 2009-100253 A 5/2009
(Continued)

OTHER PUBLICATIONS

International Search Report and Written Opinion mailed on Oct. 4, 2022, received for PCT Application PCT/JP2022/028460, filed on Jul. 22, 2022, 8 pages including English Translation.

*Primary Examiner* — Seung H Lee
(74) *Attorney, Agent, or Firm* — XSENSUS LLP

(57) ABSTRACT

An antenna element includes a body including laminated insulator layers, a first ground conductor, and a radiation conductor overlapping the first ground conductor along a first direction from the first ground conductor. Guard ground conductors are provided in the body along the first direction to surround the radiation conductor. The guard ground conductors include second ground conductors electrically interconnected, and one or more first interlayer connection conductors piercing the insulator layers. The second ground conductors are shaped to not make a circuit of the radiation conductor, and are positioned at multiple positions relative to up-down directions. The second ground conductors each have an overlapping portion that overlaps the second ground conductor positioned adjacent to the overlapping portion in an upward or downward direction, and a non-overlapping portion that does not overlap the second ground conductor positioned adjacent to the non-overlapping portion in the upward or downward direction.

20 Claims, 13 Drawing Sheets

(56) References Cited

U.S. PATENT DOCUMENTS

| | | | | |
|---|---|---|---|---|
| 2017/0279191 | A1* | 9/2017 | Yosui | H01Q 1/38 |
| 2019/0252781 | A1* | 8/2019 | Isayama | H04B 5/26 |

FOREIGN PATENT DOCUMENTS

| | | | |
|---|---|---|---|
| JP | 2009-206781 | A | 9/2009 |
| JP | 2011-040703 | A | 2/2011 |
| JP | 2018-182501 | A | 11/2018 |
| WO | 2006/028136 | A1 | 3/2006 |
| WO | 2022/064864 | A1 | 3/2022 |

* cited by examiner

ANTENNA ELEMENT

CROSS-REFERENCE TO RELATED APPLICATIONS

This application is a continuation of International Application No. PCT/JP2022/028460, filed Jul. 22, 2022, and which claims priority to Japanese Application No. 2021-133496, filed Aug. 18, 2021. The entire contents of all prior applications are hereby incorporated by reference.

TECHNICAL FIELD

The present disclosure relates to an antenna element including an antenna.

BACKGROUND ART

A conventional antenna for radar device includes a radiation portion board, antenna parts, a belt loop-like conductor, a plurality of through-holes, and a ground plane. The antenna parts and the belt loop-like conductor are positioned on an upper main surface of the radiation portion board. The belt loop-like conductor makes a circuit of the antenna parts, as seen in up-down directions. The ground plane is positioned on a lower main surface of the radiation portion board. The plurality of through-holes electrically connect the belt loop-like conductor and the ground plane by piercing the radiation portion board in the up-down directions. In such an antenna for radar device, directivity of the antenna for radar device is heightened because the belt loop-like conductor is provided.

CITATION LIST

Patent Document

Patent Document 1: Japanese Unexamined Patent Application Publication No. 2009-100253

SUMMARY OF INVENTION

Technical Problem

In regard to the antenna for radar device described in Patent Document 1, there is a demand for reduction in a capacitance between the antenna parts and the belt loop-like conductor.

One aspect of the present disclosure to provide an antenna element by which a capacitance between a radiation conductor and a guard ground conductor can be reduced while directivity of the antenna element is maintained.

Solution to Problem

An antenna element includes a body including laminated insulator layers, a first ground conductor, and a radiation conductor overlapping the first ground conductor along a first direction from the first ground conductor. Guard ground conductors are provided in the body along the first direction to surround the radiation conductor. The guard ground conductors include second ground conductors electrically interconnected, and one or more first interlayer connection conductors piercing the insulator layers. The second ground conductors are shaped to not make a circuit of the radiation conductor, and are positioned at multiple positions relative to up-down directions. The second ground conductors each have an overlapping portion that overlaps the second ground conductor positioned adjacent to the overlapping portion in an upward or downward direction, and a non-overlapping portion that does not overlap the second ground conductor positioned adjacent to the non-overlapping portion in the upward or downward direction.

Advantageous Effects of Invention

According to the exemplary antenna element of the present disclosure, the capacitance between the radiation conductor and the guard ground conductor can be reduced while directivity of the antenna element is maintained.

DESCRIPTION OF EMBODIMENTS

Embodiments

[Structure of Antenna Element 10]

Figure 1:
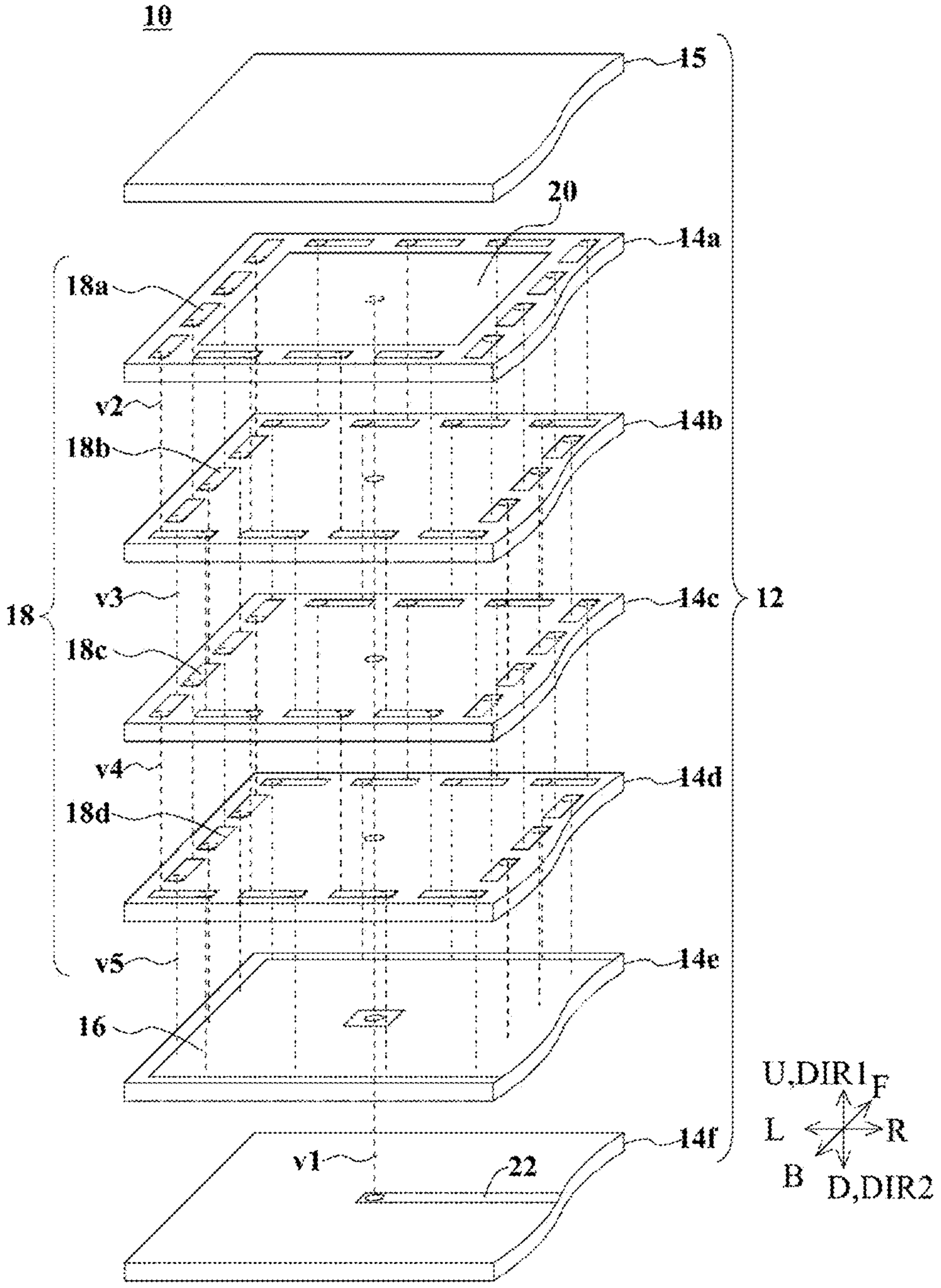
FIG. 1 is an exploded perspective view of an antenna element according to exemplary aspects of the present disclosure.
Figure 2:
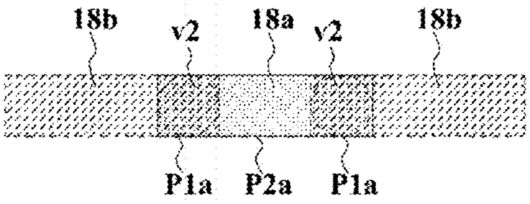
FIG. 2 is a top view of second ground conductors according to exemplary aspects of the present disclosure.
Figure 3:
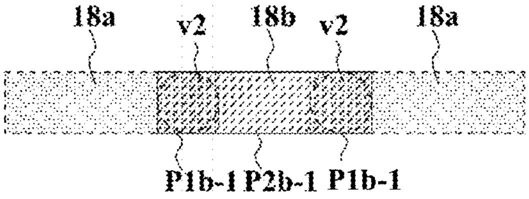
FIG. 3 is a top view of the second ground conductors according to exemplary aspects of the present disclosure.
Figure 4:
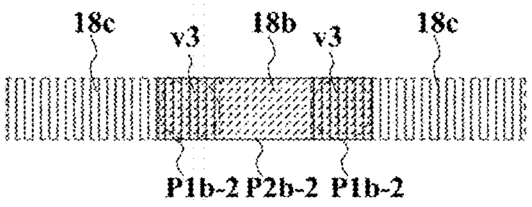
FIG. 4 is a top view of second ground conductors according to exemplary aspects of the present disclosure.
Figure 5:
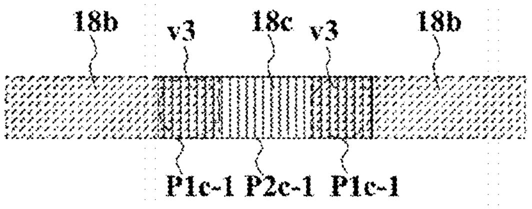
FIG. 5 is a top view of the second ground conductors according to exemplary aspects of the present disclosure.
Figure 6:
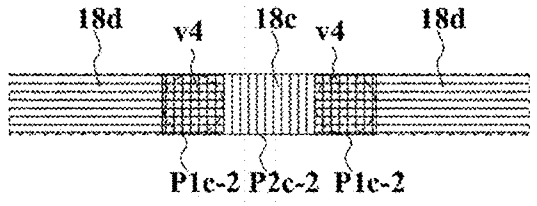
FIG. 6 is a top view of second ground conductors according to exemplary aspects of the present disclosure.
Figure 7:
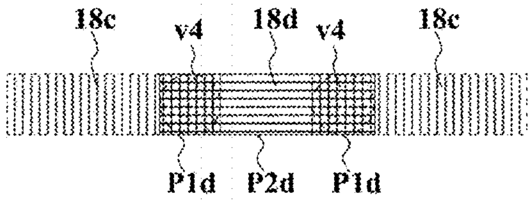
FIG. 7 is a top view of the second ground conductors according to exemplary aspects of the present disclosure.

Hereinbelow, a structure of an antenna element 10 according to an exemplary embodiment of the present disclosure will be described with reference to the drawings. FIG. 1 is an exploded perspective view of the antenna element 10. FIG. 2 and FIG. 3 are top views of second ground conductors 18*a* and 18*b*. FIG. 4 and FIG. 5 are top views of second ground conductors 18*b* and 18*c*. FIG. 6 and FIG. 7 are top views of second ground conductors 18*c* and 18*d*.

Hereinbelow, laminating directions of a main body 12 of the antenna element 10 are defined as up-down directions. One of the up-down directions is a first direction DIR1 and the other of the up-down directions is a second direction DIR2. In the present exemplary embodiment, an upward direction is the first direction DIR1 and a downward direction is the second direction DIR2. Further, the antenna element 10 has a rectangular shape as seen in the up-down directions. As seen in the up-down directions, directions in which long sides of the antenna element 10 extend are defined as left-right directions. As seen in the up-down directions, directions in which short sides of the antenna element 10 extend are defined as front-back directions. The up-down directions, the left-right directions, and the front-back directions are orthogonal to one another. Incidentally, definition of the directions herein represents one example. Therefore, directions at a time when the antenna element 10 is actually used and the directions herein do not need to coincide. Further, the up-down directions may be inverted in the drawings. Similarly, the left-right directions may be inverted in the drawings. The front-back directions may be inverted in the drawings.

Hereinbelow, X represents a component or a member of the antenna element 10. Herein, portions of X are defined as follows, unless otherwise noted. A front portion of X means a front half of X. A back portion of X means a back half of X. A left portion of X means a left half of X. A right portion of X means a right half of X. An upper portion of X means an upper half of X. A lower portion of X means a lower half of X. A front end of X means an end of X in a frontward direction. A back end of X means an end of X in a backward direction. A left end of X means an end of X in a leftward direction. A right end of X means an end of X in a rightward direction. A top end of X means an end of X in the upward direction. A bottom end of X means an end of X in the downward direction. A front end portion of X means the front end and a vicinity thereof of X. A back end portion of X means the back end and a vicinity thereof of X. A left end portion of X means the left end and a vicinity thereof of X. A right end portion of X means the right end and a vicinity thereof of X. A top end portion of X means the top end and a vicinity thereof of X. A bottom end portion of X means the bottom end and a vicinity thereof of X.

The antenna element 10 is used for electronic equipment such as a cellular phone, for instance. As illustrated in FIG. 1, the antenna element 10 includes the main body 12, a first ground conductor 16, guard ground conductors 18, a radiation conductor 20, and an extended conductor 22.

The main body 12 has a plate-like shape. The main body 12 has a rectangular shape as seen in the up-down directions. The main body 12 has a structure in which a protection layer 15 and insulator layers 14*a* to 14*f* are laminated in the up-down directions. The protection layer 15 and the insulator layers 14*a* to 14*f* are arranged in order of mention from top to bottom. Material of the insulator layers 14*a* to 14*f* is thermoplastic resin. The thermoplastic resin is thermoplastic resin such as liquid crystal polymer or polytetrafluoroethylene (PTFE), for instance. The material of the insulator layers 14*a* to 14*f* may be polyimide.

The protection layer 15 is a resist layer. The protection layer 15 is positioned on an upper main surface of the insulator layer 14*a*. The protection layer 15 protects the radiation conductor 20 and the second ground conductors 18*a* that are positioned on the upper main surface of the insulator layer 14*a*. The protection layer 15 may be formed by pasting of an insulative sheet on the upper main surface of the insulator layer 14*a* or may be formed by printing of insulative resin paste on the upper main surface of the insulator layer 14*a*.

The first ground conductor 16, the guard ground conductors 18, and the radiation conductor 20 function as a patch antenna. The first ground conductor 16 is provided in the main body 12. More particularly, the first ground conductor 16 is positioned on an upper main surface of the insulator layer 14*e*. As illustrated in FIG. 1, the first ground conductor 16 has a rectangular shape as seen in the up-down directions. Long sides of the first ground conductor 16 extend in the left-right directions. Short sides of the first ground conductor 16 extend in the front-back directions. The first ground conductor 16 is connected to a ground potential.

The radiation conductor 20 is provided in the main body 12. More particularly, the radiation conductor 20 is positioned on the upper main surface of the insulator layer 14*a*. Therefore, the radiation conductor 20 is positioned above (in the first direction DIR1 from) the first ground conductor 16. As illustrated in FIG. 1, the radiation conductor 20 has a rectangular shape as seen in the up-down directions. Long sides of the radiation conductor 20 extend in the left-right directions. Short sides of the radiation conductor 20 extend in the front-back directions. The radiation conductor 20 overlaps with the first ground conductor 16 as seen in the up-down directions. In the present exemplary embodiment, an entirety of the radiation conductor 20 overlaps with the first ground conductor 16 as seen in the up-down directions. Accordingly, the radiation conductor 20 does not run off outer edges of the first ground conductor 16 as seen in the up-down directions. The radiation conductor 20 radiates and/or receives high-frequency signals.

The extended conductor 22 is provided on an upper main surface of the insulator layer 14*f*. The extended conductor 22 has a linear shape extending in the left-right directions. A left end portion of the extended conductor 22 overlaps with the first ground conductor 16 as seen in the up-down directions. The high-frequency signals that are radiated and/or received by the radiation conductor 20 are transferred through the extended conductor 22.

An interlayer connection conductor v1 pierces the insulator layers 14*a* to 14*e* in the up-down directions. The interlayer connection conductor v1 electrically connects a center portion of the radiation conductor 20 and the left end portion of the extended conductor 22. Incidentally, an opening is provided at a position on the first ground conductor 16 that overlaps with the interlayer connection conductor v1 as seen in the up-down directions so that the interlayer connection conductor v1 and the first ground conductor 16 do not short-circuit.

The guard ground conductors 18 are provided in the main body 12. The guard ground conductors 18 are positioned above (in the first direction DIR1 from) the first ground conductor 16. At least a portion of the guard ground conductors 18 overlaps with the first ground conductor 16 as seen in the up-down directions. In the present exemplary embodiment, an entirety of the guard ground conductors 18 overlaps with the first ground conductor 16 as seen in the up-down directions. Further, the guard ground conductors 18 surround the radiation conductor 20 as seen in the up-down directions. More particularly, the guard ground conductors 18 have a rectangular and loop-like shape as seen in the up-down directions. Further, the guard ground conductors 18 are positioned around the radiation conductor 20 as seen in the up-down directions. The guard ground conductors 18 are spaced apart from the radiation conductor 20 as seen in the up-down directions. Accordingly, the guard ground conductors 18 do not overlap with the radiation conductor 20 as seen in the up-down directions. Such the guard ground conductors 18 are connected to the ground potential. Hereinbelow, the guard ground conductors 18 will be described in more detail.

The guard ground conductors 18 include the plurality of second ground conductors 18*a*, the plurality of second ground conductors 18*b*, the plurality of second ground conductors 18*c*, the plurality of second ground conductors 18*d*, a plurality of interlayer connection conductors v2, a plurality of interlayer connection conductors v3, a plurality of interlayer connection conductors v4, and a plurality of interlayer connection conductors v5. The plurality of second ground conductors 18*a*, the plurality of second ground conductors 18*b*, the plurality of second ground conductors 18*c*, and the plurality of second ground conductors 18*d* are positioned at two or more positions with respect to the up-down directions. In the present exemplary embodiment, the plurality of second ground conductors 18*a*, the plurality of second ground conductors 18*b*, the plurality of second ground conductors 18*c*, and the plurality of second ground conductors 18*d* are positioned in different layers with respect to the up-down directions.

The insulator layer 14*a* has the upper main surface and a lower main surface. The plurality of second ground conductors 18*a* are positioned on the upper main surface of the insulator layer 14*a*. The plurality of second ground conductors 18*a* each have a shape that does not make a circuit of the radiation conductor 20 as seen in the up-down directions. That is, the plurality of second ground conductors 18*a* each do not have a loop-like shape as seen in the up-down directions. In the present exemplary embodiment, the plurality of second ground conductors 18*a* are each shaped like a rectangle having long sides extending in the left-right directions or a rectangle having long sides extending in the front-back directions. The plurality of second ground conductors 18*a* are arranged on a track that makes a circuit of the radiation conductor 20 as seen in the up-down directions. In the present exemplary embodiment, the plurality of (e.g., fourteen) second ground conductors 18*a* positioned in the same layer with respect to the up-down directions are arranged at equal intervals as seen in the up-down directions.

The insulator layer 14*b* has an upper main surface and a lower main surface. The plurality of second ground conductors 18*b* are positioned on the upper main surface of the insulator layer 14*b*. The plurality of second ground conductors 18*b* each have a shape that does not make a circuit of the radiation conductor 20 as seen in the up-down directions. That is, the plurality of second ground conductors 18*b* each do not have a loop-like shape as seen in the up-down directions. In the present exemplary embodiment, the plurality of second ground conductors 18*b* are each shaped like a rectangle having long sides extending in the left-right directions or a rectangle having long sides extending in the front-back directions. The plurality of second ground conductors 18*b* are arranged on a track that makes a circuit of the radiation conductor 20 as seen in the up-down directions. In the present exemplary embodiment, the plurality of (e.g., fourteen) second ground conductors 18*b* positioned in the same layer with respect to the up-down directions are arranged at equal intervals as seen in the up-down directions. Positions of the plurality of second ground conductors 18*b*, however, slightly differ from positions of the plurality of second ground conductors 18*a*, as seen in the up-down directions, as will be described below.

Herein, the plurality of second ground conductors 18*a* each have two overlapping portions P1*a* and a non-overlapping portion P2*a*, as illustrated in FIG. 2. The overlapping portions P1*a* overlap with the two second ground conductors 18*b* positioned adjacent to the overlapping portions P1*a* in the downward direction, as seen in the up-down directions. The non-overlapping portion P2*a* does not overlap with the second ground conductors 18*b* positioned adjacent to the non-overlapping portion P2*a* in the downward direction, as seen in the up-down directions. The non-overlapping portion P2*a* is positioned between the two overlapping portions P1*a*.

Further, the plurality of second ground conductors 18*b* each have two overlapping portions P1*b*-1 and a non-overlapping portion P2*b*-1, as illustrated in FIG. 3. The overlapping portions P1*b*-1 overlap with the two second ground conductors 18*a* positioned adjacent to the overlapping portions P1*b*-1 in the upward direction, as seen in the up-down directions. The non-overlapping portion P2*b*-1 does not overlap with the second ground conductors 18*a* positioned adjacent to the non-overlapping portion P2*b*-1 in the upward direction, as seen in the up-down directions. The non-overlapping portion P2*b*-1 is positioned between the two overlapping portions P1*b*-1.

The plurality of interlayer connection conductors v2 pierce the insulator layer 14*a* in the up-down directions. The interlayer connection conductors v2 electrically connect the overlapping portions P1*a* (see FIG. 2) of the second ground conductors 18*a* and the overlapping portions P1*b*-1 (see FIG. 3) of the second ground conductors 18*b* that adjoin in the up-down directions.

The insulator layer 14*c* (first insulator layer) has an upper main surface (first main surface) and a lower main surface (second main surface). The plurality of second ground conductors 18*c* (third ground conductors) are positioned on the upper main surface (first main surface) of the insulator layer 14*c*. The plurality of second ground conductors 18*c* each have a shape that does not make a circuit of the radiation conductor 20 as seen in the up-down directions. That is, the plurality of second ground conductors 18*c* each do not have a loop-like shape as seen in the up-down directions. In the present embodiment, the plurality of second ground conductors 18*c* are each shaped like a rectangle having long sides extending in the left-right directions or a rectangle having long sides extending in the front-back directions. The plurality of second ground conductors 18*c* are arranged on a track that makes a circuit of the radiation conductor 20 as seen in the up-down directions. In the present exemplary embodiment, the plurality of (e.g., fourteen) second ground conductors 18*c* positioned in the same layer with respect to the up-down directions are arranged at equal intervals as seen in the up-down directions. Entire outer edges of such the plurality of second ground conductors 18*c* overlap with respective entire outer edges of the plurality of second ground conductors 18*a* as seen in the up-down directions. Accordingly, positions of the plurality of second ground conductors 18*c* slightly differ from the positions of the plurality of second ground conductors 18*b*, as seen in the up-down directions.

Herein, the plurality of second ground conductors 18*b* each have two overlapping portions P1*b*-2 and a non-overlapping portion P2*b*-2, as illustrated in FIG. 4. The overlapping portions P1*b*-2 overlap with the two second ground conductors 18*c* positioned adjacent to the overlapping portions P1*b*-2 in the downward direction, as seen in the up-down directions. The non-overlapping portion P2*b*-2 does not overlap with the second ground conductors 18*c* positioned adjacent to the non-overlapping portion P2*b*-2 in the downward direction, as seen in the up-down directions. The non-overlapping portion P2*b*-2 is positioned between the two overlapping portions P1*b*-2.

Further, the plurality of second ground conductors 18*c* each have two overlapping portions P1*c*-1 and a non-overlapping portion P2*c*-1, as illustrated in FIG. 5. The overlapping portions P1*c*-1 overlap with the two second ground conductors 18*b* positioned adjacent to the overlapping portions P1*c*-1 in the upward direction, as seen in the up-down directions. The non-overlapping portion P2*c*-1 does not overlap with the second ground conductors 18*b* positioned adjacent to the non-overlapping portion P2*c*-1 in the upward direction, as seen in the up-down directions. The non-overlapping portion P2*c*-1 is positioned between the two overlapping portions P1*c*-1.

The plurality of interlayer connection conductors v3 pierce the insulator layer 14*b* in the up-down directions. The interlayer connection conductors v3 electrically connect the overlapping portions P1*b*-2 (see FIG. 4) of the second ground conductors 18*b* and the overlapping portions P1*c*-1 (see FIG. 5) of the second ground conductors 18*c* that adjoin in the up-down directions.

The insulator layer 14*d* (second insulator layer) has an upper main surface (third main surface) and a lower main surface (fourth main surface). The plurality of second ground conductors 18*d* (fourth ground conductors) are positioned on the upper main surface (first main surface) of the insulator layer 14*d*. The plurality of second ground conductors 18*d* each have a shape that does not make a circuit of the radiation conductor 20 as seen in the up-down directions. That is, the plurality of second ground conductors 18*d* each do not have a loop-like shape as seen in the up-down directions. In the present exemplary embodiment, the plurality of second ground conductors 18*d* are each shaped like a rectangle having long sides extending in the left-right directions or a rectangle having long sides extending in the front-back directions. The plurality of second ground conductors 18*d* are arranged on a track that makes a circuit of the radiation conductor 20 as seen in the up-down directions. In the present exemplary embodiment, the plurality of (fourteen) second ground conductors 18*d* positioned in the same layer with respect to the up-down directions are arranged at equal intervals as seen in the up-down directions. Entire outer edges of such the plurality of second ground conductors 18*d* overlap with respective entire outer edges of the plurality of second ground conductors 18*b*, as seen in the up-down directions. Accordingly, positions of the plurality of second ground conductors 18*d* slightly differ from the positions of the plurality of second ground conductors 18*c*, as seen in the up-down directions.

Herein, the plurality of second ground conductors 18*c* each have two overlapping portions P1*c*-2 and a non-overlapping portion P2*c*-2, as illustrated in FIG. 6. The overlapping portions P1*c*-2 overlap with the two second ground conductors 18*d* positioned adjacent to the overlapping portions P1*c*-2 in the downward direction, as seen in the up-down directions. The non-overlapping portion P2*c*-2 does not overlap with the second ground conductors 18*d* positioned adjacent to the non-overlapping portion P2*c*-2 in the downward direction, as seen in the up-down directions. The non-overlapping portion P2*c*-2 is positioned between the two overlapping portions P1*c*-2.

Further, the plurality of second ground conductors 18*d* each have two overlapping portions P1*d* and a non-overlapping portion P2*d*, as illustrated in FIG. 7. The overlapping portions P1*d* overlap with the two second ground conductors 18*c* positioned adjacent to the overlapping portions P1*d* in the upward direction, as seen in the up-down directions. The non-overlapping portion P2*d* does not overlap with the second ground conductors 18*c* positioned adjacent to the non-overlapping portion P2*d* in the upward direction, as seen in the up-down directions. The non-overlapping portion P2*d* is positioned between the two overlapping portions P1*d*.

The plurality of interlayer connection conductors v4 pierce the insulator layer 14*d* in the up-down directions. The interlayer connection conductors v4 electrically connect the overlapping portions P1*c*-2 (see FIG. 6) of the second ground conductors 18*c* and the overlapping portions P1*d* (see FIG. 7) of the second ground conductors 18*d* that adjoin in the up-down directions.

The plurality of second ground conductors 18*a*, the plurality of second ground conductors 18*b*, the plurality of second ground conductors 18*c*, and the plurality of second ground conductors 18*d* as described above are arranged on the loop-like track that makes the circuit of the radiation conductor 20 as seen in the up-down directions. In the present exemplary embodiment, the plurality of second ground conductors 18*a*, the plurality of second ground conductors 18*b*, the plurality of second ground conductors 18*c*, and the plurality of second ground conductors 18*d* overlap one another and thereby form a loop that makes a circuit of the radiation conductor 20, as seen in the up-down directions. In the present exemplary embodiment, the plurality of second ground conductors 18*a*, the plurality of second ground conductors 18*b*, the plurality of second ground conductors 18*c*, and the plurality of second ground conductors 18*d* overlap one another and thereby form the loop that is rectangular, as seen in the up-down directions.

Further, as seen in the up-down directions, no ground conductor other than the first ground conductor 16 exists between the guard ground conductors 18 and the radiation conductor 20. In the present exemplary embodiment, in particular, no ground conductor other than the first ground conductor 16 exists between the overlapping portions P1*a*, P1*b*-1, P1*b*-2, P1*c*-1, P1*c*-2, and P1*d* and the radiation conductor 20, as seen in the up-down directions. Similarly, no ground conductor other than the first ground conductor 16 exists between the non-overlapping portions P2*a*, P2*b*-1, P2*b*-2, P2*c*-1, P2*c*-2, and P2*d* and the radiation conductor 20, as seen in the up-down directions.

The plurality of interlayer connection conductors v5 (second interlayer connection conductors) pierce the insulator layer 14*d* in the up-down directions. The interlayer connection conductors v5 electrically connect the first ground conductor 16 and the second ground conductors 18*d* (second ground conductors). The plurality of interlayer connection conductors v5 each do not overlap with the plurality of interlayer connection conductors v4 (first interlayer connection conductors) connected to the plurality of second ground conductors 18*d*, as seen in the up-down directions. The plurality of second ground conductors 18*d* are the plurality of second ground conductors to which the plurality of interlayer connection conductors v5 (second interlayer connection conductors) are connected.

The first ground conductor 16, the radiation conductor 20, the plurality of second ground conductors 18*a*, the plurality of second ground conductors 18*b*, the plurality of second ground conductors 18*c*, the plurality of second ground conductors 18*d*, and the extended conductor 22 are conductor layers formed by patterning of metal foil stuck on the upper main surfaces of the insulator layers 14*a* to 14*f*, for instance. The metal foil is copper foil, for instance. Further, the interlayer connection conductors v1 to v5 are via hole conductors, for instance. The via hole conductors are formed by formation of through-holes in the insulator layers 14*a* to 14*e*, filling of conductive paste in the through-holes, and sintering of the conductive paste.

[Effect]

According to the exemplary antenna element 10, directivity of the patch antenna can be improved. More particularly, the guard ground conductors 18 do not overlap with the radiation conductor 20 as seen in the up-down directions. Accordingly, the guard ground conductors 18 are positioned around the radiation conductor 20 as seen in the up-down directions. Thus, high-frequency signals directed to the guard ground conductors 18 among the high-frequency signals radiated by the radiation conductor 20 are reflected and absorbed by the guard ground conductors 18. A radiation angle of the high-frequency signals radiated from the antenna element 10 is narrowed. According to the exemplary antenna element 10, consequently, the directivity of the patch antenna is improved. Incidentally, on condition that the radiation conductor 20 receives the high-frequency signals as well, the directivity of the patch antenna is improved as with a condition that the radiation conductor 20 radiates the high-frequency signals.

According to the exemplary antenna element 10, a capacitance between the radiation conductor 20 and the guard ground conductors 18 can be reduced. More particularly, in the antenna element 10, the plurality of second ground conductors 18*a*, the plurality of second ground conductors 18*b*, the plurality of second ground conductors 18*c*, and the plurality of second ground conductors 18*d* are positioned at two or more positions with respect to the up-down directions. Thus, the plurality of second ground conductors 18*a*, the plurality of second ground conductors 18*b*, the plurality of second ground conductors 18*c*, and the plurality of second ground conductors 18*d* include the second ground conductors (such as second ground conductors 18*a*) that are nearer to the radiation conductor 20 and the second ground conductors (such as second ground conductors 18*d*) that are farther from the radiation conductor 20. Therefore, a capacitance generated between the second ground conductors (such as the second ground conductors 18*d*) that are farther from the radiation conductor 20 and the radiation conductor 20 is smaller than a capacitance generated between the second ground conductors (such as the second ground conductors 18*a*) that are nearer to the radiation conductor 20 and the radiation conductor 20. In this manner, in the guard ground conductors 18, a portion where it is difficult for the capacitance between the guard ground conductors 18 and the radiation conductor 20 to be generated is formed. Thus, according to the exemplary antenna element 10, the capacitance between the radiation conductor 20 and the guard ground conductors 18 can be reduced. With reduction in the capacitance between the radiation conductor 20 and the guard ground conductors 18, Q-value of the antenna element 10 increases. Accordingly, gain of the antenna element 10 is improved.

In the antenna element 10, the plurality of second ground conductors 18*a*, the plurality of second ground conductors 18*b*, the plurality of second ground conductors 18*c*, and the plurality of second ground conductors 18*d* overlap one another and thereby form the loop that makes the circuit of the radiation conductor 20, as seen in the up-down directions. Thus, the radiation angle of the high-frequency signals radiated from the antenna element 10 is further narrowed. According to the exemplary antenna element 10, consequently, the directivity of the patch antenna is further improved.

According to the exemplary antenna element 10, damages to the main body 12 at time of thermal compression bonding of the main body 12 are reduced. More particularly, in the antenna element 10, the plurality of interlayer connection conductors v5 are not aligned with the plurality of interlayer connection conductors v4 in the up-down directions. That is, the interlayer connection conductors v5 electrically connect the first ground conductor 16 and the second ground conductors 18*d*. The plurality of interlayer connection conductors v5 each do not overlap with the plurality of interlayer connection conductors v4 connected to the plurality of second ground conductors 18*d* to which the plurality of interlayer connection conductors v5 are connected, as seen in the up-down directions. Thus, according to the exemplary antenna element 10, the damages to the main body 12 at the time of the thermal compression bonding of the main body 12 are reduced.

First Modification

Figure 8:
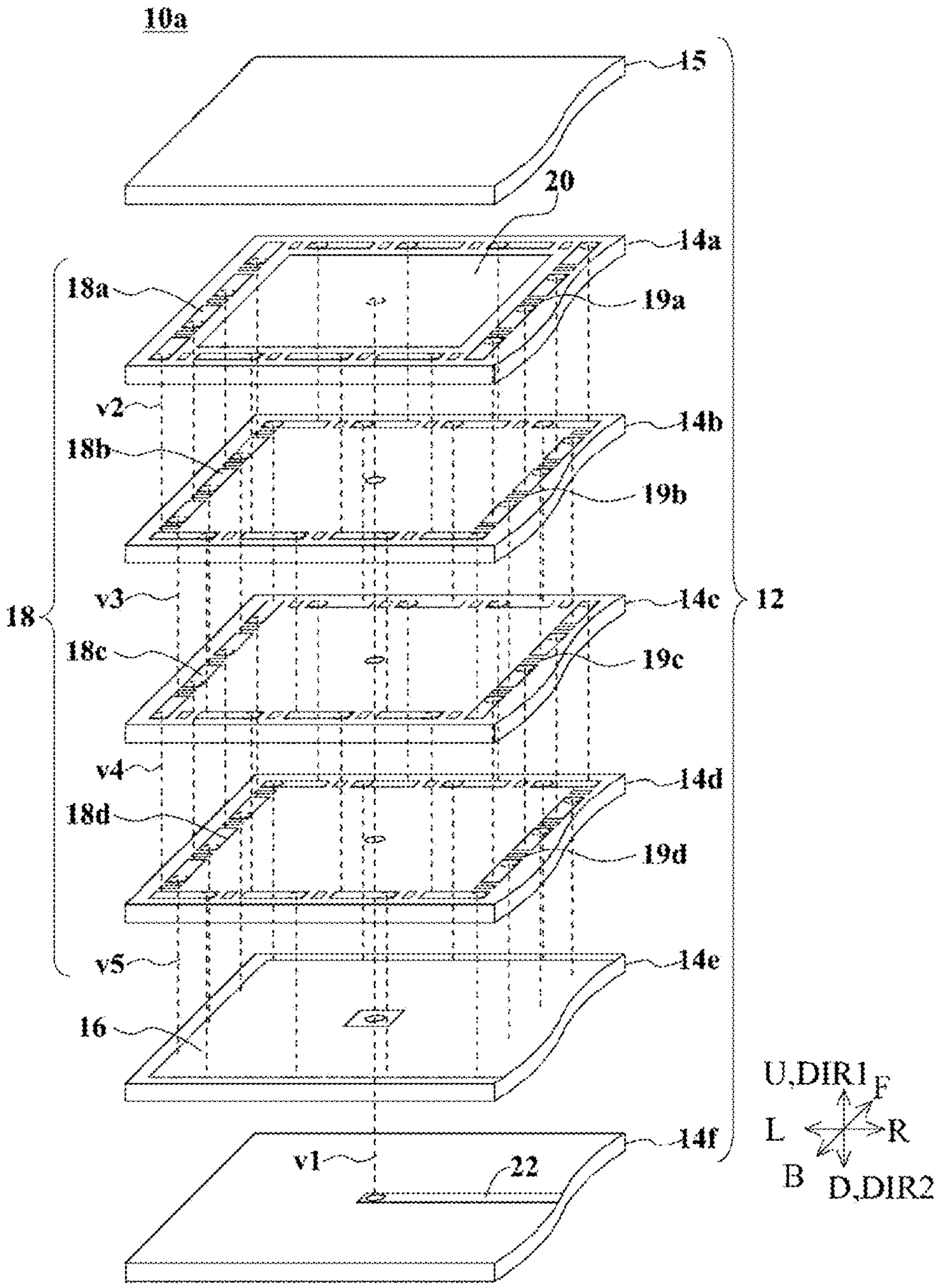
FIG. 8 is an exploded perspective view of an antenna element according to exemplary aspects of the present disclosure.

Hereinbelow, an exemplary antenna element 10*a* according to a first modification will be described with reference to the drawing. FIG. 8 is an exploded perspective view of the antenna element 10*a*.

The antenna element 10*a* differs from the antenna element 10 in that the antenna element 10*a* further includes a plurality of floating conductors 19*a*, a plurality of floating conductors 19*b*, a plurality of floating conductors 19*c*, and a plurality of floating conductors 19*d* that are not electrically connected to the guard ground conductors 18. Potential of the plurality of floating conductors 19*a*, potential of the plurality of floating conductors 19*b*, potential of the plurality of floating conductors 19*c*, and potential of the plurality of floating conductors 19*d* are each floating potentials. In the present exemplary embodiment, the plurality of floating conductors 19*a*, the plurality of floating conductors 19*b*, the plurality of floating conductors 19*c*, and the plurality of floating conductors 19*d* are not connected to other conductors.

The plurality of floating conductors 19*a* are positioned on the upper main surface of the insulator layer 14*a*. The plurality of floating conductors 19*a* are each positioned between the plurality of second ground conductors 18*a*, as seen in the up-down directions. Thus, the plurality of second ground conductors 18*a* and the plurality of floating conductors 19*a* are arranged on a track that makes a circuit of the radiation conductor 20 as seen in the up-down directions. Further, the plurality of floating conductors 19*a* overlap with the plurality of respective second ground conductors 18*b*, as seen in the up-down directions.

The plurality of floating conductors 19*b* are positioned on the upper main surface of the insulator layer 14*b*. The plurality of floating conductors 19*b* are each positioned between the plurality of second ground conductors 18*b*, as seen in the up-down directions. Thus, the plurality of second ground conductors 18*b* and the plurality of floating conductors 19*b* are arranged on a track that makes a circuit of the radiation conductor 20, as seen in the up-down directions. Further, the plurality of floating conductors 19*b* overlap with the plurality of respective second ground conductors 18*a* and the plurality of respective second ground conductors 18*c*, as seen in the up-down directions.

The plurality of floating conductors 19*c* are positioned on the upper main surface (first main surface) of the insulator layer 14*c* (first insulator layer). The plurality of floating conductors 19*c* are each positioned between the plurality of second ground conductors 18*c*, as seen in the up-down directions. Thus, the plurality of second ground conductors 18*c* (third ground conductors) and the plurality of floating conductors 19*c* are arranged on a track that makes a circuit of the radiation conductor 20, as seen in the up-down directions. Further, the plurality of floating conductors 19*c* overlap with the plurality of respective second ground conductors 18*b* and the plurality of respective second ground conductors 18*d* (fourth ground conductors), as seen in the up-down directions.

The plurality of floating conductors 19*d* are positioned on the upper main surface of the insulator layer 14*d*. The plurality of floating conductors 19*d* are each positioned between the plurality of second ground conductors 18*d*, as seen in the up-down directions. Thus, the plurality of second ground conductors 18*d* and the plurality of floating conductors 19*d* are arranged on a track that makes a circuit of the radiation conductor 20, as seen in the up-down directions. Further, the plurality of floating conductors 19*d* overlap with the plurality of respective second ground conductors 18*c*, as seen in the up-down directions.

The other structures of the antenna element 10*a* are the same as those of the antenna element 10 and description thereof is therefore omitted. The antenna element 10*a* is capable of achieving the same function effects that the antenna element 10 achieves.

According to the exemplary antenna element 10*a*, intrusion of noises into the antenna element 10*a* and radiation of noises from the antenna element 10*a* are reduced. More particularly, the plurality of second ground conductors 18*a* and the plurality of floating conductors 19*a* are arranged on the track that makes the circuit of the radiation conductor 20, as seen in the up-down directions. Thus, noises that are to intrude into the antenna element 10*a* are absorbed by the plurality of floating conductors 19*a* in addition to the plurality of second ground conductors 18*a*. Similarly, noises that are to be radiated from the antenna element 10*a* are absorbed by the plurality of floating conductors 19*a* in addition to the plurality of second ground conductors 18*a*. Accordingly, the intrusion of noises into the antenna element 10*a* and the radiation of noises from the antenna element 10*a* are reduced.

Second Modification

Figure 9:
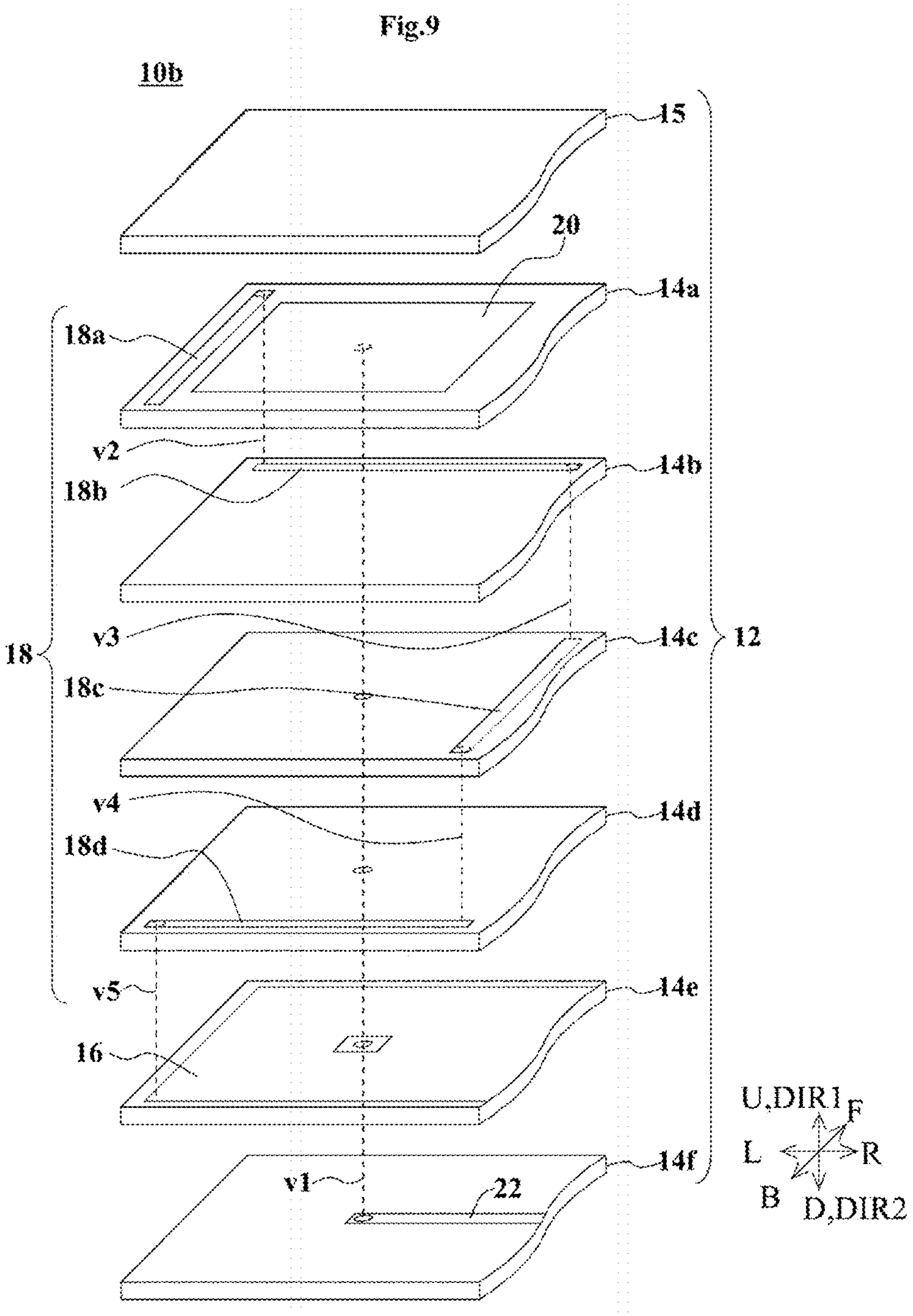
FIG. 9 is an exploded perspective view of an antenna element according to exemplary aspects of the present disclosure.

Hereinbelow, an exemplary antenna element 10*b* according to a second modification will be described with reference to the drawing. FIG. 9 is an exploded perspective view of the antenna element 10*b*.

The antenna element 10*b* differs from the antenna element 10 in shapes of the second ground conductors 18*a* to 18*d*. The second ground conductors 18*a* to 18*d* overlap one another and thereby form a loop that is rectangular, as seen in the up-down directions. The second ground conductors 18*a* to 18*d* each make one side of the loop that is rectangular. More particularly, the second ground conductor 18*a* makes a left short side of a rectangle. The second ground conductor 18*b* makes a front long side of the rectangle. The second ground conductor 18*c* makes a right short side of the rectangle. The second ground conductor 18*d* makes a back long side of the rectangle.

The interlayer connection conductor v2 electrically connects a front end portion of the second ground conductor 18*a* and a left end portion of the second ground conductor 18*b*. The interlayer connection conductor v3 electrically connects a right end portion of the second ground conductor 18*b* and a back end portion of the second ground conductor 18*c*. The interlayer connection conductor v4 electrically connects the back end portion of the second ground conductor 18*c* and a right end portion of the second ground conductor 18*d*. The interlayer connection conductor v5 electrically connects a left end portion of the second ground conductor 18*d* and the first ground conductor 16.

The other structures of the antenna element 10*b* are the same as those of the antenna element 10 and description thereof is therefore omitted. The antenna element 10*b* is capable of achieving the same function effects that the antenna element 10 achieves.

Third Modification

Figure 10:
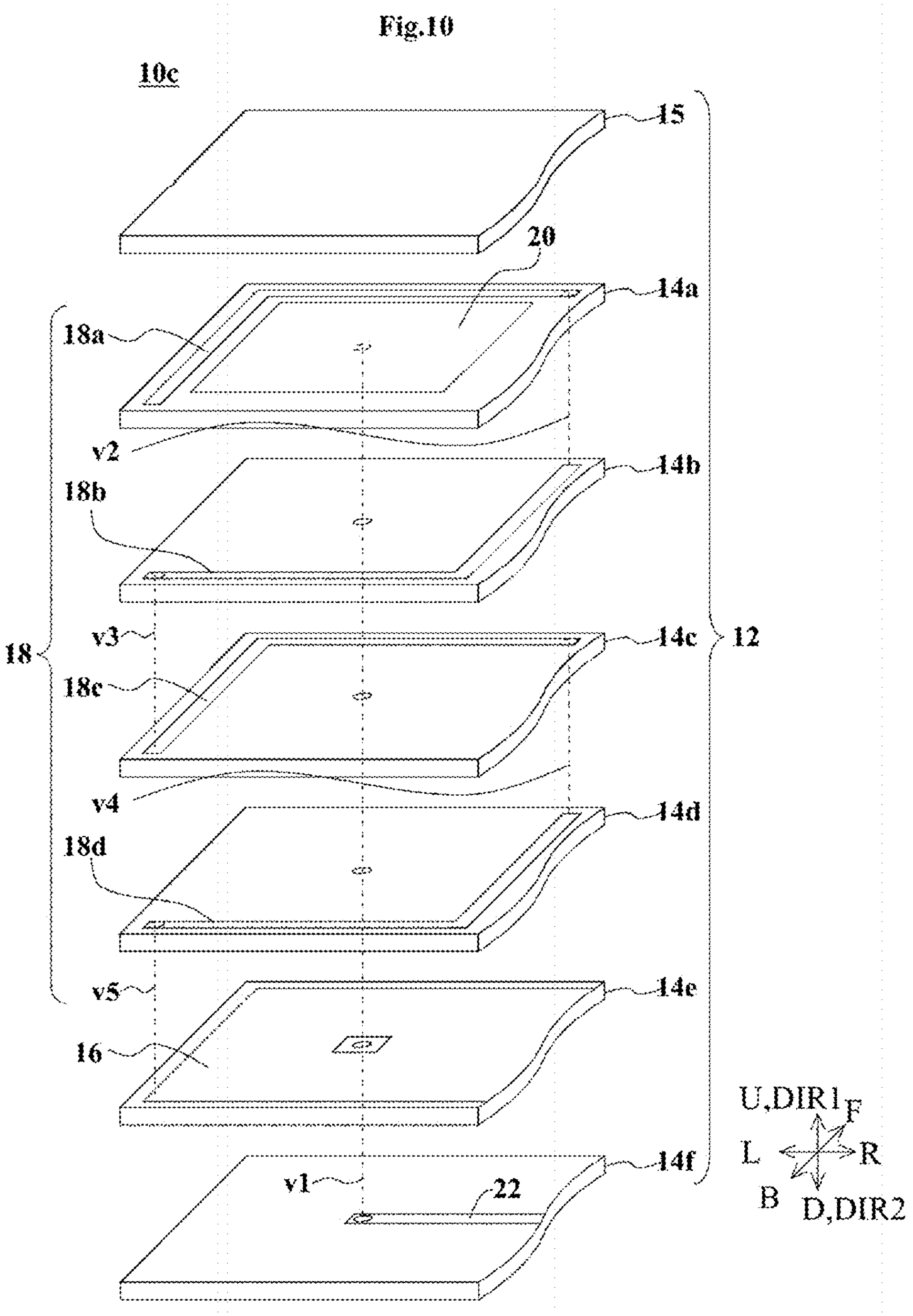
FIG. 10 is an exploded perspective view of an antenna element according to exemplary aspects of the present disclosure.

Hereinbelow, an exemplary antenna element 10*c* according to a third modification will be described with reference to the drawing. FIG. 10 is an exploded perspective view of the antenna element 10*c*.

The antenna element 10*c* differs from the antenna element 10*b* in shapes of the second ground conductors 18*a* to 18*d*. The second ground conductors 18*a* to 18*d* overlap one another and thereby form a loop that is rectangular, as seen in the up-down directions. The second ground conductors 18*a* to 18*d* each make two sides of the loop that is rectangular. More particularly, the second ground conductor 18*a* makes a left short side and a front long side of a rectangle. The second ground conductor 18*b* makes a right short side and a back long side of the rectangle. The second ground conductor 18*c* makes the left short side and the front long side of the rectangle. The second ground conductor 18*d* makes the right short side and the back long side of the rectangle.

The other structures of the antenna element 10*c* are the same as those of the antenna element 10*b* and description thereof is therefore omitted. The antenna element 10*c* is capable of achieving the same function effects that the antenna element 10*b* achieves.

Fourth Modification

Figure 11:
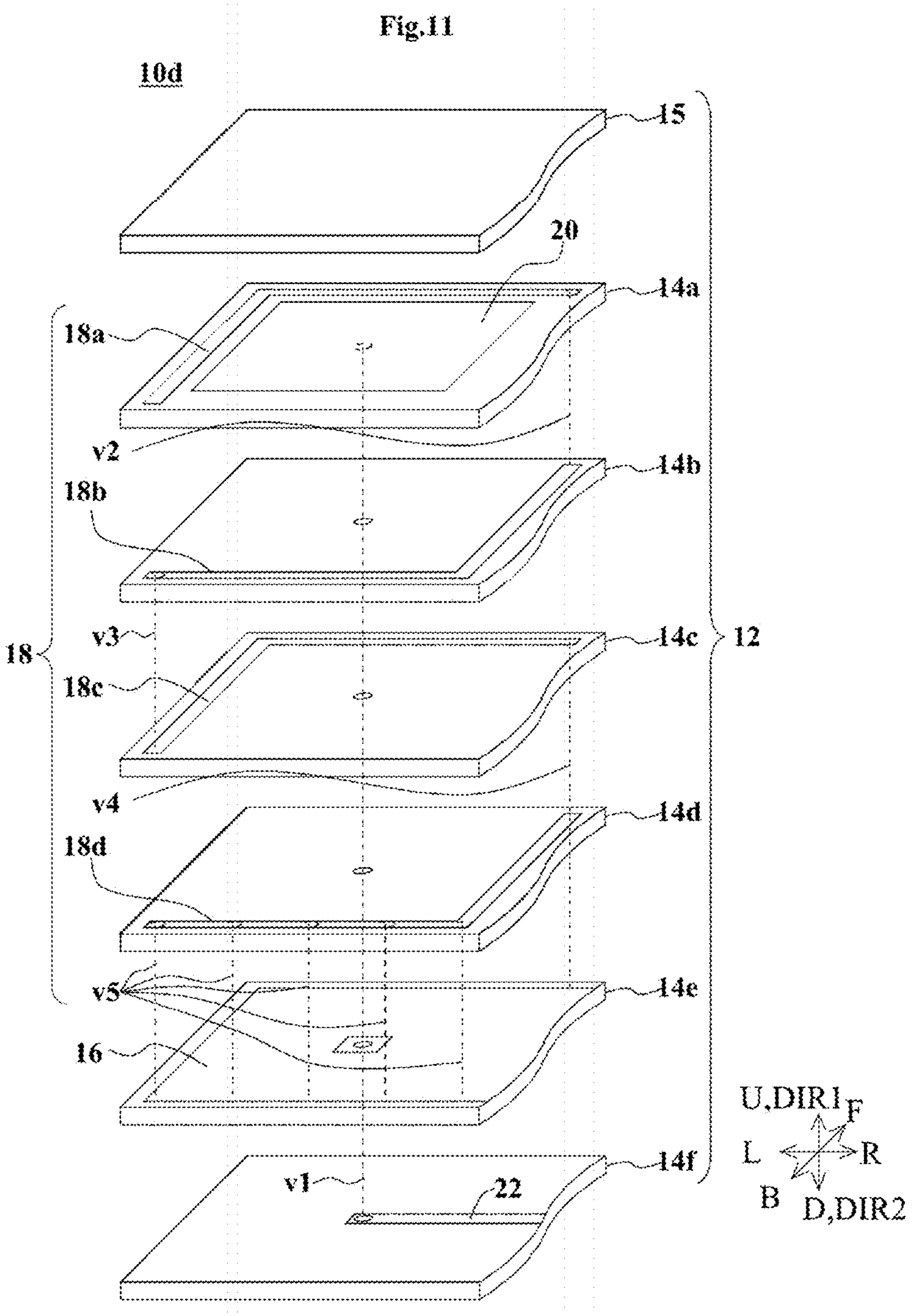
FIG. 11 is an exploded perspective view of an antenna element according to exemplary aspects of the present disclosure.

Hereinbelow, an exemplary antenna element 10*d* according to a fourth modification will be described with reference to the drawing. FIG. 11 is an exploded perspective view of the antenna element 10*d*.

The antenna element 10*d* differs from the antenna element 10*c* in that the guard ground conductors 18 include a plurality of interlayer connection conductors v5. The plurality of interlayer connection conductors v5 (second interlayer connection conductors) pierce the insulator layer 14*d* in the up-down directions. The plurality of interlayer connection conductors v5 (second interlayer connection conductors) electrically connect the first ground conductor 16 and the second ground conductor 18*d*.

The other structures of the antenna element 10*d* are the same as those of the antenna element 10*c* and description thereof is therefore omitted. The antenna element 10*d* is capable of achieving the same function effects that the antenna element 10*c* achieves.

Fifth Modification

Figure 12:
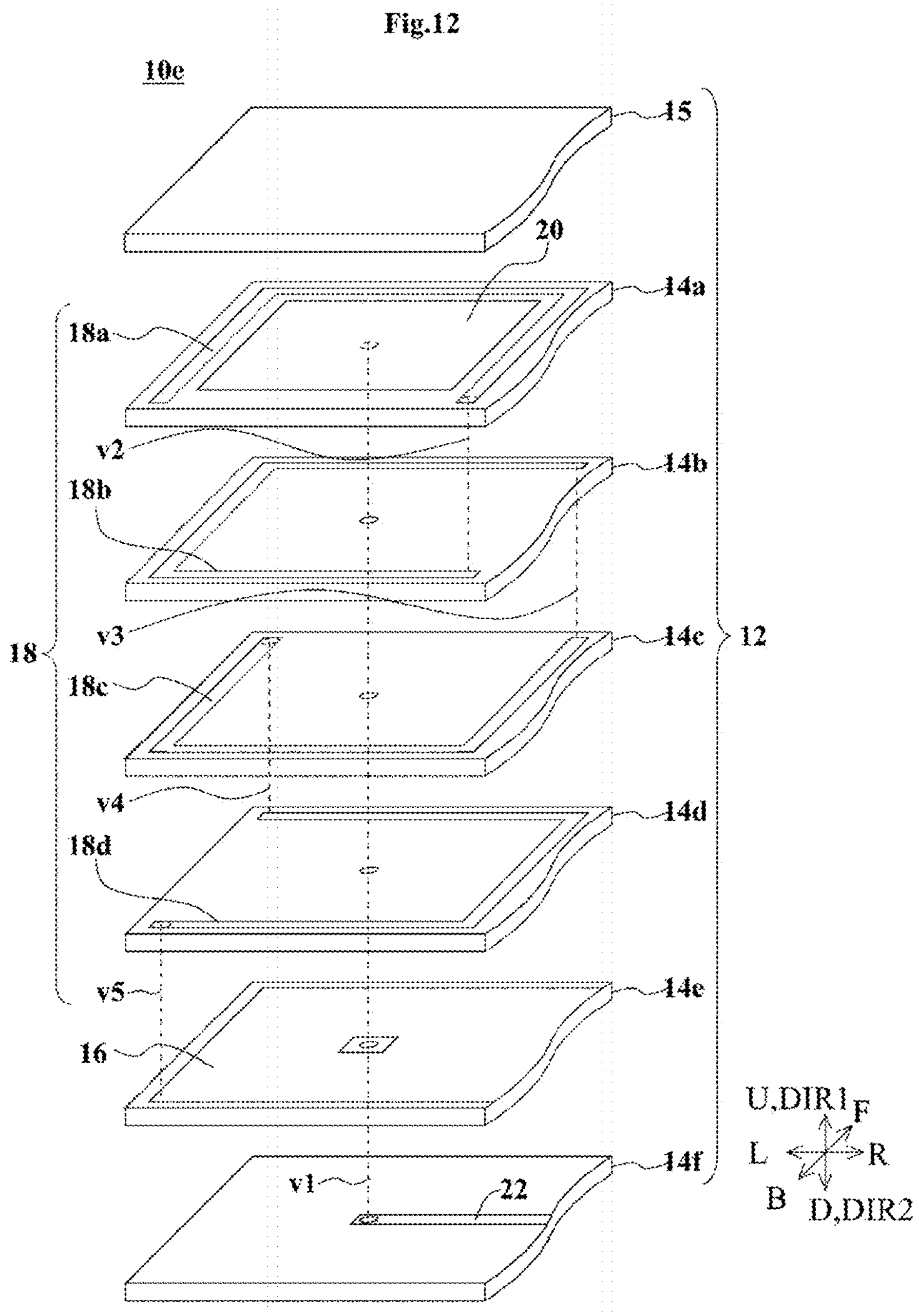
FIG. 12 is an exploded perspective view of an antenna element according to exemplary aspects of the present disclosure.

Hereinbelow, an exemplary antenna element 10*e* according to a fifth modification will be described with reference to the drawing. FIG. 12 is an exploded perspective view of the antenna element 10*e*.

The antenna element 10*e* differs from the antenna element 10*b* in shapes of the second ground conductors 18*a* to 18*d*. The second ground conductors 18*a* to 18*d* overlap one another and thereby form a loop that is rectangular, as seen in the up-down directions. The second ground conductors 18*a* to 18*d* each make three sides of the loop that is rectangular. More particularly, the second ground conductor 18*a* makes a left short side, a front long side, and a right short side of a rectangle. The second ground conductor 18*b* makes a back long side, the left short side, and the front long side of the rectangle. The second ground conductor 18*c* makes the right short side, the back long side, and the left short side of the rectangle. The second ground conductor 18*d* makes the front long side and the right short side, and the back long side of the rectangle.

The other structures of the antenna element 10*e* are the same as those of the antenna element 10*b* and description thereof is therefore omitted. The antenna element 10*e* is capable of achieving the same function effects that the antenna element 10*b* achieves.

Sixth Modification

Figure 13:
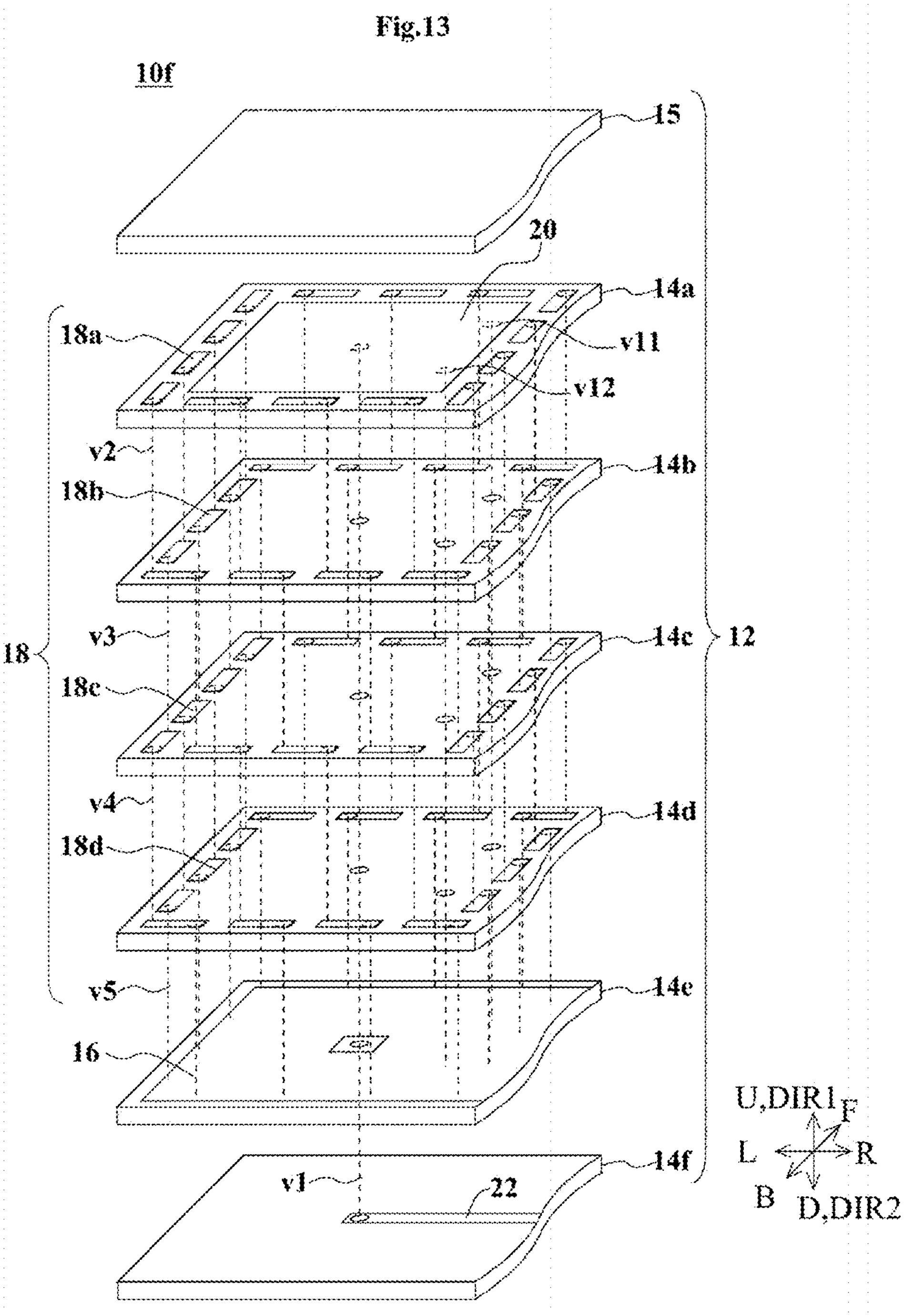
FIG. 13 is an exploded perspective view of an antenna element according to exemplary aspects of the present disclosure.

Hereinbelow, an exemplary antenna element 10*f* according to a sixth modification will be described with reference to the drawing. FIG. 13 is an exploded perspective view of the antenna element 10*f*.

The antenna element 10*f* differs from the antenna element 10 in that the antenna element 10*f* further includes interlayer connection conductors v11 and v12. In the antenna element 10*f*, the interlayer connection conductors v11 and v12 pierce the insulator layers 14*a* to 14*d* in the up-down directions. The interlayer connection conductors v11 and v12 electrically connect the radiation conductor 20 and the first ground conductor 16. Thus, the antenna element 10*f* includes an inverted F antenna.

The other structures of the antenna element 10*f* are the same as those of the antenna element 10 and description thereof is therefore omitted. The antenna element 10*f* is capable of achieving the same function effects that the antenna element 10 achieves.

Miniaturization of the antenna element 10*f* can be developed because the antenna element 10*f* includes the inverted F antenna.

Seventh Modification

Figure 14:
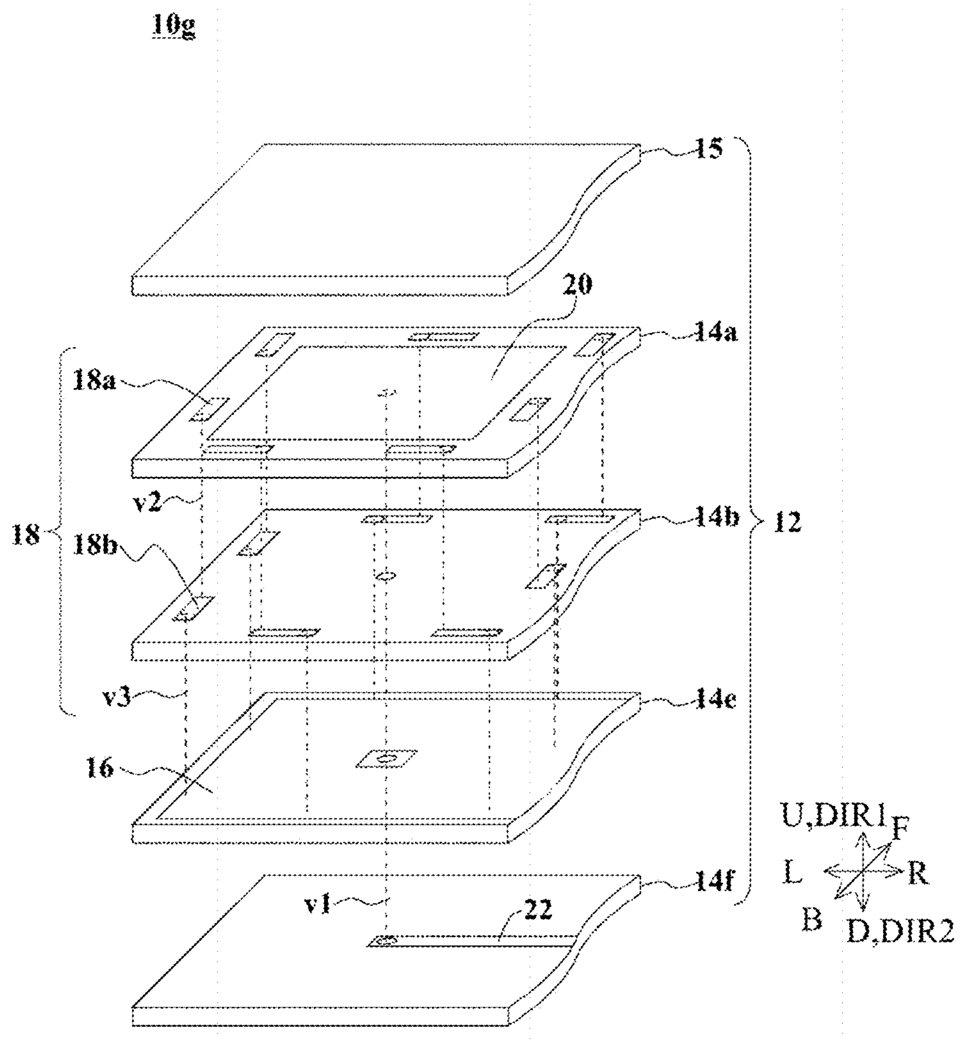
FIG. 14 is an exploded perspective view of an antenna element according to exemplary aspects of the present disclosure.

Hereinbelow, an exemplary antenna element 10*g* according to a seventh modification will be described with reference to the drawing. FIG. 14 is an exploded perspective view of the antenna element 10*g*.

The antenna element 10*g* differs from the antenna element 10 in that the antenna element 10*g* does not include the insulator layers 14*c* and 14*d*, the plurality of second ground conductors 18*c*, and the plurality of second ground conductors 18*d*. Accordingly, in a loop-like track that makes a circuit of the radiation conductor 20 as seen in the up-down directions, portions where the plurality of second ground conductors 18*a* and the plurality of second ground conductors 18*b* are not positioned exist. That is, a plurality of pairs of a second ground conductor 18*a* and a second ground conductor 18*b* are arranged at equal intervals.

The other structures of the antenna element 10*g* are the same as those of the antenna element 10 and description thereof is therefore omitted. The antenna element 10*g* is capable of achieving the same function effects that the antenna element 10 achieves.

Eighth Modification

Figure 15:
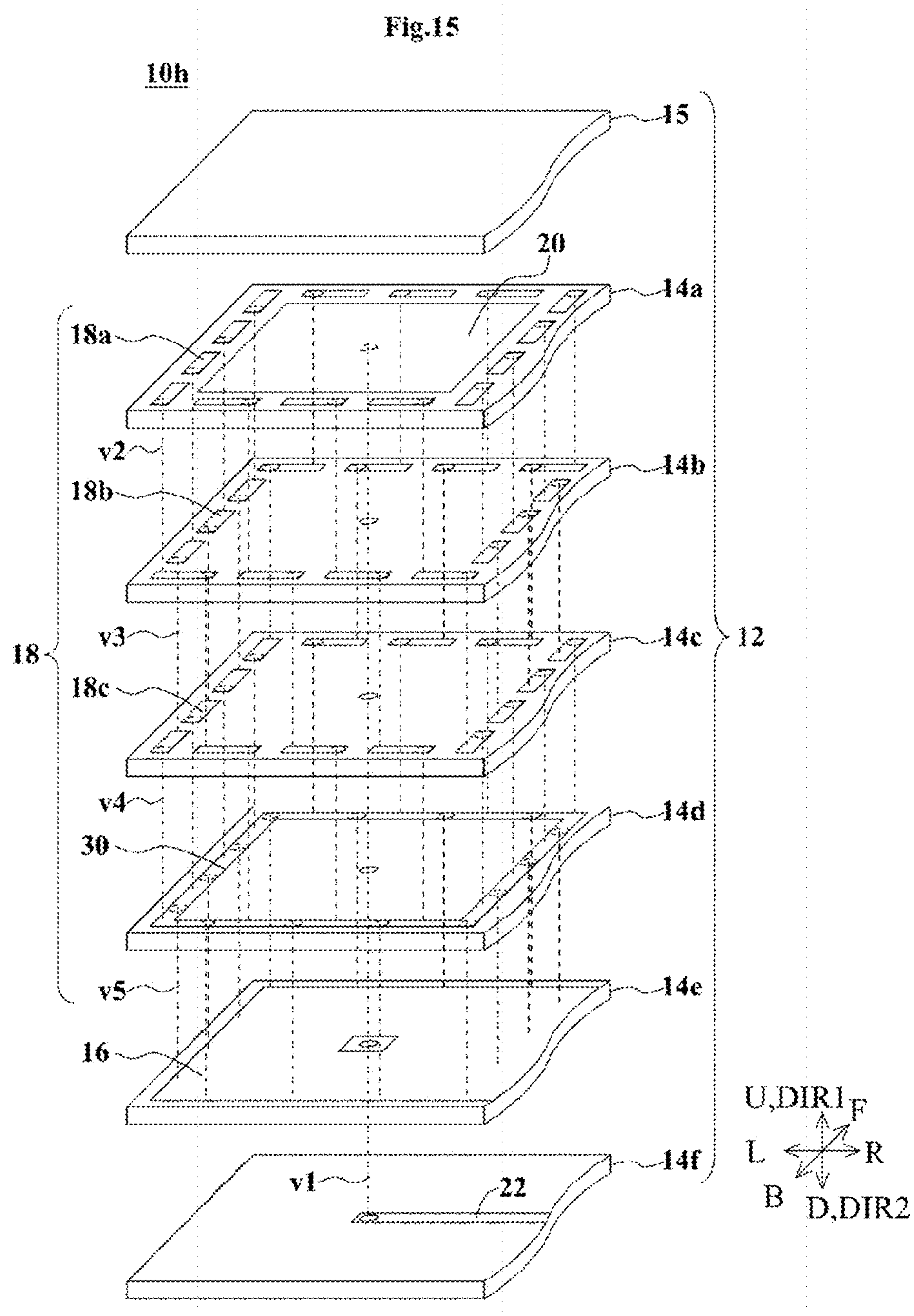
FIG. 15 is an exploded perspective view of an antenna element according to exemplary aspects of the present disclosure.

Hereinbelow, an exemplary antenna element 10*h* according to an eighth modification will be described with reference to the drawing. FIG. 15 is an exploded perspective view of the antenna element 10*h*.

The antenna element 10*h* differs from the antenna element 10 in that the guard ground conductors 18 further include a fifth ground conductor 30 in place of the plurality of second ground conductors 18*d*. The fifth ground conductor 30 overlaps with the plurality of second ground conductors 18*a*, the plurality of second ground conductors 18*b*, and the plurality of second ground conductors 18*c*, as seen in the up-down directions. The fifth ground conductor 30 has a loop-like shape as seen in the up-down directions.

The other structures of the antenna element 10*h* are the same as those of the antenna element 10 and description thereof is therefore omitted. The antenna element 10*h* is capable of achieving the same function effects that the antenna element 10 achieves.

Ninth Modification

Figure 16:
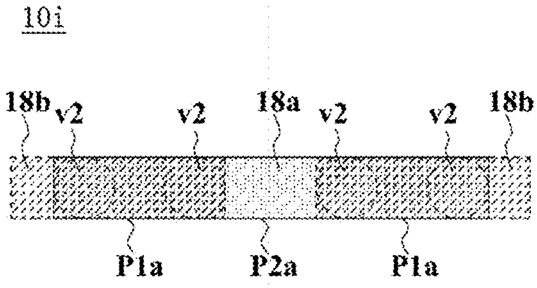
FIG. 16 is a top view of the second ground conductors of an antenna element according to exemplary aspects of the present disclosure.
Figure 17:
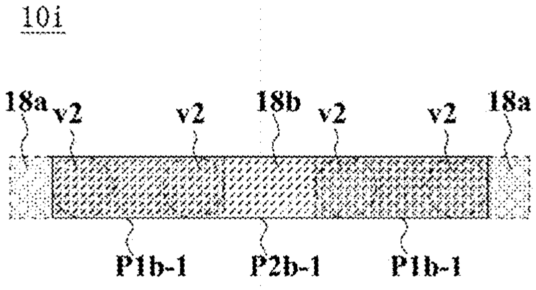
FIG. 17 is a top view of the second ground conductors of the antenna element according to exemplary aspects of the present disclosure.

Hereinbelow, an exemplary antenna element 10*i* according to a ninth modification will be described with reference to the drawings. FIG. 16 and FIG. 17 are top views of the second ground conductors 18*a* and 18*b* of the antenna element 10*i*.

In the antenna element 10*i*, the plurality of interlayer connection conductors v2 electrically connect one overlapping portion P1*a* of the second ground conductor 18*a* and one overlapping portion P1*b*-1 of the second ground conductor 18*b* that adjoin in the up-down directions.

The other structures of the antenna element 10*i* are the same as those of the antenna element 10 and description thereof is therefore omitted. The antenna element 10*i* is capable of achieving the same function effects that the antenna element 10 achieves.

Other Embodiments

Antenna elements according to the present disclosure are not limited to the exemplary antenna elements 10 and 10*a* to 10*i* and may be modified within a range of purport thereof. Further, structures of the antenna elements 10 and 10*a* to 10*i* may be combined arbitrarily.

Incidentally, in the antenna elements 10 and 10*a* to 10*i*, it is not necessary for the plurality of second ground conductors to overlap one another and to thereby form the loop that makes a circuit of the radiation conductor 20, as seen in the up-down directions. Accordingly, the plurality of second ground conductors may exist partially around the radiation conductor 20 as seen in the up-down directions. For instance, the second ground conductors 18*c* and 18*d* may be absent from the antenna element 10*b*.

Incidentally, it is sufficient if the number of the floating conductors is one or more.

Incidentally, it is sufficient if the number of the second ground conductors 18*c* (third ground conductors) is one or more.

Incidentally, it is sufficient if the number of the second ground conductors 18*d* (fourth ground conductors) is one or more.

Incidentally, it is sufficient if the number of the interlayer connection conductors v4 (first interlayer connection conductors) is one or more.

Incidentally, it is sufficient if the number of the interlayer connection conductors v5 (second interlayer connection conductors) is one or more.

Incidentally, the downward direction may be the first direction DIR1 and the upward direction may be the second direction DIR2.

Incidentally, a portion of the guard ground conductors 18 may overlap with the first ground conductor 16 as seen in the up-down directions.

Incidentally, the antenna elements 10 and 10*a* to 10*i* may include a monopole antenna instead of the patch antenna or the inverted F antenna.

Incidentally, in the antenna elements 10 and 10*a* to 10*i*, it is sufficient if at least a portion of a plurality of second ground conductors positioned in the same layer with respect to the up-down directions are arranged at equal intervals as seen in the up-down directions.

REFERENCE SIGNS LIST

10, 10*a* to 10*i* antenna element
12 main body
14*a* to 14*f* insulator layer
15 protection layer
16 first ground conductor
18 guard ground conductor
18*a* to 18*d* second ground conductor
19*a* to 19*d* floating conductor
20 radiation conductor
22 extended conductor
30 fifth ground conductor
P1*a*, P1*b*-1, P1*b*-2, P1*c*-1, P1*c*-2, P1*d* overlapping portion
P2*a*, P2*b*-1, P2*b*-2, P2*c*-1, P2*c*-2, P2*d* non-overlapping portion
v1 to v5, v11, v12 interlayer connection conductor

The invention claimed is:

1. An antenna element with one of up-down directions being a first direction and with the other of the up-down directions being a second direction, the antenna element comprising:

a main body including a structure in which a plurality of insulator layers are laminated in the up-down directions;

a first ground conductor provided in the main body;

a radiation conductor provided in the main body, positioned in the first direction from the first ground conductor, and overlapping with the first ground conductor as seen in the up-down directions; and guard ground conductors provided in the main body, positioned in the first direction from the first ground conductor, and surrounding the radiation conductor as seen in the up-down directions, wherein the guard ground conductors include a plurality of second ground conductors electrically connected to one another and one or more first interlayer connection conductors piercing the insulator layers in the up-down directions, the plurality of second ground conductors each have a shape that does not make a circuit of the radiation conductor as seen in the up-down directions, the plurality of second ground conductors are positioned at two or more positions with respect to the up-down directions, the plurality of second ground conductors each have an overlapping portion and a non-overlapping portion, the overlapping portion overlaps with the second ground conductor positioned adjacent to the overlapping portion in an upward direction or a downward direction, as seen in the up-down directions, the non-overlapping portion does not overlap with the second ground conductor positioned adjacent to the non-overlapping portion in the upward direction or the downward direction, as seen in the up-down directions.

2. The antenna element according to claim 1, wherein the plurality of second ground conductors are arranged on a loop-like track that makes a circuit of the radiation conductor as seen in the up-down directions, and a portion where the plurality of second ground conductors are not positioned exists on the loop-like track.

3. The antenna element according to claim 1, wherein the plurality of second ground conductors overlap each other to form a loop that makes a circuit of the radiation conductor, as seen in the up-down directions.

4. The antenna element according to claim 3, wherein the plurality of second ground conductors overlap each other to form a rectangular loop, as seen in the up-down directions, and the plurality of second ground conductors each make one side of the rectangular loop.

5. The antenna element according to claim 3, wherein the plurality of second ground conductors overlap each other to form a rectangular loop, as seen in the up-down directions, and the plurality of second ground conductors each make two sides of the rectangular loop.

6. The antenna element according to claim 3, wherein the plurality of second ground conductors overlap each other to form a rectangular loop, as seen in the up-down directions, and the plurality of second ground conductors each make three sides of the rectangular loop.

7. The antenna element according to claim 1, wherein the antenna element further includes one or more floating conductors that are not electrically connected to the guard ground conductors, the plurality of insulator layers include a first insulator layer having a first main surface and a second main surface, the plurality of second ground conductors include one or more third ground conductors positioned on the first main surface, the one or more floating conductors are positioned on the first main surface, and the one or more third ground conductors and the one or more floating conductors are arranged on a track that makes a circuit of the radiation conductor, as seen in the up-down directions.

8. The antenna element according to claim 7, wherein the plurality of insulator layers include a second insulator layer having a third main surface and a fourth main surface, the plurality of second ground conductors include one or more fourth ground conductors positioned on the third main surface, and the one or more floating conductors respectively overlap with the one or more fourth ground conductors, as seen in the up-down directions.

9. The antenna element according to claim 1, wherein the guard ground conductors further include one or more second interlayer connection conductors piercing the insulator layers in the up-down directions and electrically connecting the first ground conductor and the second ground conductors, and the one or more second interlayer connection conductors do not overlap with the one or more first interlayer connection conductors connected to one or more of the second ground conductors to which the one or more second interlayer connection conductors are connected, as seen in the up-down directions.

10. The antenna element according to claim 1, wherein the guard ground conductors further include a plurality of second interlayer connection conductors piercing the insulator layers in the up-down directions and electrically connecting the first ground conductor and the second ground conductors.

11. The antenna element according to claim 1, wherein a plurality of the first interlayer connection conductors electrically connect the overlapping portions of two of the second ground conductors adjoining in the up-down directions.

12. The antenna element according to claim 1, wherein no ground conductor other than the first ground conductor exists between the overlapping portions and the radiation conductor as seen in the up-down directions.

13. The antenna element according to claim 1, wherein the antenna element further includes a connection conductor electrically connecting the radiation conductor and the first ground conductor.

14. The antenna element according to claim 1, wherein at least a portion of a plurality of the second ground conductors positioned in a same layer with respect to the up-down directions are arranged at equal intervals as seen in the up-down directions.

15. The antenna element according to claim 1, wherein no ground conductor other than the first ground conductor exists between the guard ground conductors and the radiation conductor as seen in the up-down directions.

16. The antenna element according to claim 15, wherein at least a portion of the guard ground conductors overlaps with the first ground conductor as seen in the up-down directions.

17. The antenna element according to claim 16, wherein the one or more first interlayer connection conductors electrically connect the overlapping portions of two of the second ground conductors adjoining in the up-down directions.

18. The antenna element according to claim 1, wherein the plurality of second ground conductors are formed by a copper foil.

19. The antenna element according to claim 1, wherein the insulator layers are formed by a thermoplastic resin.

20. The antenna element according to claim 19, wherein the thermoplastic resin includes a liquid crystal polymer or polytetrafluoroethylene (PTFE).

* * * * *